(12) United States Patent
Bressler

(10) Patent No.: US 10,253,268 B2
(45) Date of Patent: Apr. 9, 2019

(54) PYROLYSIS REACTIONS IN THE PRESENCE OF AN ALKENE

(71) Applicant: THE GOVERNORS OF THE UNIVERSITY OF ALBERTA, Edmonton (CA)

(72) Inventor: David Bressler, St. Albert (CA)

(73) Assignee: The Governors of the University of Alberta, Edmonton, Alberta (CA)

( * ) Notice: Subject to any disclaimer, the term of this patent is extended or adjusted under 35 U.S.C. 154(b) by 0 days.

(21) Appl. No.: 14/775,949

(22) PCT Filed: Mar. 14, 2014

(86) PCT No.: PCT/IB2014/001595
§ 371 (c)(1),
(2) Date: Sep. 14, 2015

(87) PCT Pub. No.: WO2014/181192
PCT Pub. Date: Nov. 13, 2014

(65) Prior Publication Data
US 2016/0024394 A1    Jan. 28, 2016

Related U.S. Application Data

(60) Provisional application No. 61/792,544, filed on Mar. 15, 2013.

(51) Int. Cl.
*C07C 1/20*      (2006.01)
*C10G 3/00*      (2006.01)
(Continued)

(52) U.S. Cl.
CPC .................. *C10G 3/40* (2013.01); *C10G 1/00* (2013.01); *C10G 1/02* (2013.01); *C10G 3/42* (2013.01); *C10L 1/04* (2013.01); *C11C 3/00* (2013.01); *C10G 2300/1014* (2013.01); *C10L 2200/0469* (2013.01); *C10L 2290/06* (2013.01); *Y02P 30/20* (2015.11)

(58) Field of Classification Search
CPC ........................................................ C10G 3/40
USPC .................................................... 585/16, 240
See application file for complete search history.

(56) References Cited

U.S. PATENT DOCUMENTS 2,437,438 A    3/1948   Petroff et al.
4,235,702 A    11/1980   Smith
(Continued)

FOREIGN PATENT DOCUMENTS

CS        275924      3/1992
GB        175974      6/1923
(Continued)

OTHER PUBLICATIONS

Jindarom, C.; Meeyoo, V.; Rirksomboon, T.; Rangsunvigit, P. "Thermochemical decomposition of sewage sludge in CO2 and N2 atmosphere", Chemosphere, 67, (2007), pp. 1477-1484.*
(Continued)

*Primary Examiner* — Philip Y Louie
*Assistant Examiner* — Aaron W Pierpoint
(74) *Attorney, Agent, or Firm* — Gardner Groff Greenwald & Villanueva, PC

(57) ABSTRACT

Described herein are methods for producing branched alkanes and branched alkenes from the pyrolysis of radical precursors.

14 Claims, 10 Drawing Sheets

US 10,253,268 B2

Page 2

(51) Int. Cl.
*C11C 3/00* (2006.01)
*C10G 1/00* (2006.01)
*C10L 1/04* (2006.01)
*C10G 1/02* (2006.01)

(56) References Cited

U.S. PATENT DOCUMENTS

| | | | |
|---|---|---|---|
| 4,395,324 A * | 7/1983 | Derbyshire | C10G 47/34 208/107 |
| 4,554,397 A | 11/1985 | Stern et al. | |
| 4,992,605 A | 2/1991 | Craig et al. | |
| 5,225,580 A | 7/1993 | Zinnen | |
| 5,578,090 A | 11/1996 | Bradin | |
| 5,705,722 A | 1/1998 | Monnier et al. | |
| 5,917,068 A | 6/1999 | Barnicki et al. | |
| 7,491,858 B2 | 2/2009 | Murzin et al. | |
| 8,067,653 B2 | 11/2011 | Bressler | |
| 8,202,413 B2 | 6/2012 | Joensen et al. | |
| 8,920,632 B2 | 12/2014 | Feugnet et al. | |
| 9,238,779 B2 * | 1/2016 | Gosselink | C10B 49/22 |
| 2003/0089027 A1 | 5/2003 | Frederick | |
| 2003/0089028 A1 | 5/2003 | Ferderick | |
| 2004/0230085 A1 | 11/2004 | Jakkula et al. | |
| 2006/0199988 A1* | 9/2006 | Kowalik | C10G 50/00 585/533 |
| 2007/0068848 A1 | 3/2007 | Monnier et al. | |
| 2007/0277429 A1 | 12/2007 | Jackam et al. | |
| 2008/0034645 A1* | 2/2008 | Bressler | C07C 1/2078 44/308 |
| 2008/0193351 A9* | 8/2008 | Boardman | B01D 53/46 423/210 |
| 2008/0229654 A1 | 9/2008 | Bradin | |
| 2008/0241339 A1* | 10/2008 | Mitchell | A23L 2/385 426/598 |
| 2008/0305531 A1 | 12/2008 | Lam et al. | |
| 2010/0160506 A1 | 6/2010 | Wu | |
| 2010/0185021 A1 | 7/2010 | Ross et al. | |
| 2011/0139596 A1* | 6/2011 | Bartek | C10B 49/22 201/2.5 |
| 2011/0184215 A1* | 7/2011 | Jess | C10G 1/02 585/240 |
| 2011/0232161 A1* | 9/2011 | Siskin | C10L 1/04 44/307 |
| 2011/0272326 A1 | 11/2011 | Feugnet | |
| 2012/0172622 A1* | 7/2012 | Kocal | C07C 51/00 562/409 |
| 2012/0203042 A1 | 8/2012 | Huger et al. | |
| 2012/0289729 A1 | 11/2012 | Holtcamp | |
| 2014/0148624 A1* | 5/2014 | Ohler | C07C 5/05 585/18 |

FOREIGN PATENT DOCUMENTS

| | | |
|---|---|---|
| GB | 218278 | 4/1925 |
| WO | 199745197 | 12/1997 |
| WO | 2004035714 | 4/2004 |
| WO | 2007027955 | 3/2007 |
| WO | 2007068798 | 6/2007 |
| WO | 2007068800 | 6/2007 |
| WO | 2007027669 | 8/2007 |
| WO | 2010132123 | 11/2010 |

OTHER PUBLICATIONS

Meng, X.; Chunming, X.; Gao, J.; Li, L.; Liu, Z. "Catalytic and Thermal Pyrolysis of Atmospheric Residue", Energy & Fuels (2009), 23, pp. 65-69.*
"International Association for Cannabis as Medicine (IACM)" (2002); pp. 1-3 (Year: 2002).*
First Office Action for Chinese Patent Application 201480021976.5 dated Jun. 27, 2016.
Ayhan Demirbas; "Biodiesel fuels from vegetable oils via catalytic and non-catalytic supercritical alcohol transesterifications and other methods: a survey," Energy Conversion & Management; 2003; 17 pgs; pp. 2093-2109, vol. 44; Elsevier Science Ltd.,Turkey.
M.E. Tat, J.H. Van Gerpen; "Biodiesel Blend Detection with a Fuel Composition Sensor,", Applied Engineering in Agriculture, 2003; 8 pgs; pp. 125-131; vol. 19(2); American Society of Agricultural Engineers.
Mustafa E. Tat, Jon H. Van Gerpen; "The Kinematic Viscosity of Biodiesel and its Blends with Diesel Fuel," JAOCS; 1999; 3 pgs; pp. 1511-1513; vol. 76; Iowa State University, Ames, Iowa.
Anjana Srivastava, Ram Prasad; "Triglycerides-based diesel fuels; Renewable & Sustainable Energy Reviews," 2000; 23 pgs; pp. 111-133; vol. 4; Elsevier Science Ltd., India.
A.V. Bridgwater, G.V.C. Peacocke; "Fast pyrolysis processes for biomass; Renewable & Sustainable Energy Reviews," 2000; 73 pgs; pp. 1-73; vol. 4; Elsevier Science Ltd.
Michael S. Graboski, Robert L. Mccormick; "Combustion of Fat and Vegetable Oil Derived Fuels in Diesel Engines," Prog. Energy Combust. Sci., 1998; 40 pgs; pp. 125-164; vol. 24; ElseVier Science Ltd., Great Britain.
S. Sensoz, D. Angin, S. Yorgun; "Influence of particle size on the pyrolysis of rapeseed (*Brassica napus* L.): fuel properties of bio-oil," Biomass & Bioenergy; 2000; 9 pgs; pp. 271-279; vol. 19; Elsevier Science Ltd., Turkey.
M. Predel, W. Kaminsky; "Pyrolysis of Rape-Seed in a Fluidised-Bed Reactor," Bioresource Technology 66; 1998; 5 pgs; pp. 113-117; Elsevier Science Ltd., Germany.
F Karaosmanoglu, E. Tetik, E. Gollu; "Biofuel production using slow pyrolysis of the straw and stalk of the rapeseed plant." Fuel Processing Technology, 1999; 12 pgs; pp. 1-12; vol. 59; Elsevier Science B.V., Turkey.
J. Piskorz, P. Majerski, D. Radlein, A. Vladars-Usas, D.S. Scott; "Flash Pyrolysis of cellulose for production of anhydro-oligomers," Journal of Analytical and Applied Pyrolysis, 2000; 22 pgs; pp. 145-166; vol. 56; Elsevier Science B.V., Canada.
Mustafa E. Tat, Jon H. Van Gerpen; "The Specific Gravity of Biadiesel and Its Blends with Diesel Fuel," JAOCS, 2000; 5 pgs; pp. 115-119; vol. 77, No. 2.
K.D. Maher, D.C.Bressler; "Pyrolysis of triglyceride materials for the production of renewable fuels and chemicals," Bioresource Technology, 2007; 18 pgs; pp. 2351-2368; vol. 98.
Katsumori Tanabe,Murray R. Gray; "Role of Fine Solids in the Coking of Vacuum Residues," Energy and Fuels, 1997; 4 pgs; pp. 1040-1043; vol. 11.
David C. Bressler, Murray R. Gray; "Hydrotreating Chemistry of Model Products from Bioprocessing of Carbazoles" Energy and Fuels, 2002; 11 pgs; pp. 1076-1086; vol. 16.
Ayhan Demirbas; "Diesel Fuel from Vegetable Oil via Transesterification and Soap Pyrolysis",Energy Sources, 2002; 8 pgs; pp. 835-841; vol. 24.
Paul H.L. Moquin, Feral Temelli, Helena Sovova, Marleny D.A. Saldana;"Kinetic modeling of glycerolysis-hydrolysis of canola oil in supercritical carbon dioxide media usin equilibrium data," The Journal of Supercritical Fluids, 2006; 8 pgs; pp. 417-424; vol. 37.
A.T. Erclyes, L. Dandik, and F.S. Erkal; "The Decomposition of Secondary Esters of Castor Oil with Fatty Acids",JOACS; Sep. 1991; 4 pgs; pp. 642-645; vol. 68, No. 9.
Snare et al. (Jun. 28, 2006) Heterogeneous Catalytic Deoxygenation of Steric Acid for Production of Biodiesel, Ind. Eng. Chem. Res., 45, 5708-5715.
Jaw, "The Thermal Decomposition Behaviors of Stearic Acid, Paraffin Wax and Polyvinyl Butyral", Thermochima Acta, pp. 165-168, 2001. Elsevier Science B.V., Taiwan.
Alencar, "Pyrolysis of Tropical Vegetable Oils", J. Agric. Food Chem. vol. 31, No. 6, pp. 1268-1270, 1983, American Chemical Society, USA.
Office Action dated Nov. 8, 2010 for Ukrainian Application No. 200901198.
Office Action dated Mar. 14. 2011 for Ukrainian application No. 200901198.
Serguchev et al. "Oxidate Decarboxylation of Carboxylic Acids", Russian Chemical Reviews, 1980, vol. 49, pp. 227-2285, Russia.

(56) References Cited

OTHER PUBLICATIONS

Kubickova et al., "Hydrocarbons for diesel fuel via decarboxylation of vegetable oils", Catalysis Today, 2005, vol. 106, pp. 197-200, Elsevier B.V., Finland.
Kirk Othmer, "Carboxylic Acid (Manufacture)," Encyclopedia of Chemical Technology, Dec. 31, 1978.
European Search Report dated Jul. 22, 2011 for European Application No. 07849051.3.
Office Action for Russian Application No. 2009105075/04 dated Jun. 30, 2011.
Foglia, et af. "Decarbonylation Dehydration of Fatty Acids to Alkenes in the Presence of Transition Metal Complexes," Journal of the American Oil Chemists Society, vol. 53, Dec. 1976, pp. 737-741.
Maier, et al. "Gas Phase Decarboxylation of Carboxylic Acids," Chem. Ber. 115, pp. 808-812 (1982).
Watanabe, et al. "Decomposition of a Long Chain Saturated Fatty Acid with Some Additives in Hot Compressed Water," Energy Conversion and Management, 47, (2006), pp. 3344-3350.
Zhang, et al. "Catalytic Decarboxylation of Fatty Acids by Iron-containing Minerals in Immature Oil Source Rocks at Low Tempature," Chinese Science Bulletin:, vol. 44, No. 16., Aug. 1999, pp. 1523-1527.
Zhe, et al. "Catalytic Decarboxylations of Fatty Acids in Immature Oil Source Rocks," Science in China, vol. 46, No. 12, Dec. 2003, pp. 1250-1260.
International Search Report and Written Opinion for PCT/IB07/04187 dated Aug. 27, 2008 (US as ISA).
International Search Report and Written Opinion for PCT/IB07/04187 dated Sep. 4, 2008 (Canada as ISA).
International Search Report and Written Opinion for PCT/IB2014/001595 dated Dec. 1, 2014.
international Preliminary Report on Patentability for PCT/IB2014/001595 dated Aug. 20, 2015.
EPO Official Communication dated Nov. 17. 2016.
European Search Report for 14795176.8 dated Feb. 5, 2016.
European Office Action for 14795176.8 dated Feb. 25, 2016.
Australian Examination Report No. 1 for AU 2014264339 dated Feb. 5, 2018, 3pp.
Australian Examination Report No. 2 for AU 2014264339 dated Feb. 20, 2018, 4pp.
English translation of Japanese Office Action for JP 2015-562423 dated Jan. 17, 2018, 2pp.
English translation of Russian Office Action for RU 2015143826/04(067578) dated Feb. 12, 2018, 11pp.
Official Action for Ukraine Application No. a 2015 10018 (original with translation) dated Jul. 6, 2018 (13pp).
Official Action for Indian Application No. 2754/MUMNP/2015 dated Nov. 16, 2018, 6pp.

* cited by examiner

PYROLYSIS REACTIONS IN THE PRESENCE OF AN ALKENE

CROSS REFERENCE TO RELATED APPLICATIONS

This application is a U.S. national phase application under 35 USC 371 of international application number PCT/IB2014/001595, filed Mar. 14, 2014, which claims priority upon U.S. provisional application Ser. No. 61/792,544, filed Mar. 15, 2013. This application is hereby incorporated by reference in its entirety for all of its teachings.

BACKGROUND

There are increasing social and economic pressures to develop renewable energy sources as well as renewable and biodegradable industrial and consumer products and materials. The catalytic conversion of natural feedstocks to value-added products has resulted in new approaches and technologies whose application spans across the traditional economic sectors. There is a new focus on biorefining, which can be described as the processing of agricultural and forestry feedstocks capturing increased value by processing them into multiple products including platform chemicals, fuels, and consumer products. The conversion of tallow and other organic oils to biodiesel has been previously studied in depth. Traditionally, this conversion involves the transesterification of the triglyceride to produce three methyl-esterified fatty acids and a free glycerol molecule. The chemical, rheological, and combustion properties of the resulting "biodiesel" have also been extensively investigated. Unfortunately, these methyl-ester based fuels have been shown to be far more susceptible to oxidation and have lower heating values than the traditional petroleum based diesel fuels. As a result the traditional biodiesels must be blended with existing diesel stock and may also have to be supplemented with antioxidants to prolong storage life and avoid deposit formation in tanks, fuel systems, and filters.

If methyl-esterification can be considered a clean controlled reaction, a relatively crude alternative that has been utilized previously in industry is pyrolysis. Pyrolysis involves the use of a thermal treatment of an agricultural substrate to produce a liquid fuel product. Most literature reports utilize raw unprocessed agricultural commodities to produce a value-added fuel. Many different approaches to pyrolysis as a mechanism of producing a liquid fuel have been reported in the literature and fall under various regimes including flash, fast, and slow pyrolysis. The pyrolysis of a variety of agricultural products under these different regimes has been previously investigated, including castor oil, pine wood, sweet sorghum, and canola. Depending on the conditions used including the temperature used, residence time, and purity of substrate the balance of products produced varies between vapors, liquids, and residual solids (char).

One of the few studies to look at the pyrolysis of fatty acids instead of the triglycerides or more complex substrates focused on the pyrolysis of the salt of the fatty acid. The conditions used in the study were such that a homogeneous decarboxylation product was not produced. Instead a mixture of hydrocarbon breakdown products was produced and was not identified by the authors. In general, the decarboxylation of carboxylic acids that do not contain other interacting functional groups at high temperature and pressure is poorly understood in the literature. Gaining a better fundamental understanding of the chemistry and methodologies necessary to promote decarboxylation of fatty acids, or cracking reactions to larger smaller alkanes and alkenes, may allow the future development of new fuel and solvent technologies. In one aspect, described herein is the thermal treatment of fatty acids under anoxic conditions. Processes of this nature hold the potential to produce a higher grade fuel than the traditional biodiesels, and yet would potentially produce higher yields of desirable products than pyrolysis.

SUMMARY

Described herein are methods for producing branched alkanes and branched alkenes from the pyrolysis of radical precursors. The branched alkanes and branched alkenes have numerous applications as fuels, platform chemicals, and solvents. The advantages of the materials, methods, and articles described herein will be set forth-in part in the description which follows, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF FIGURES

The accompanying Figures, which are incorporated in and constitute a part of this specification, illustrate several aspects described below.

DETAILED DESCRIPTION

Figure 1:
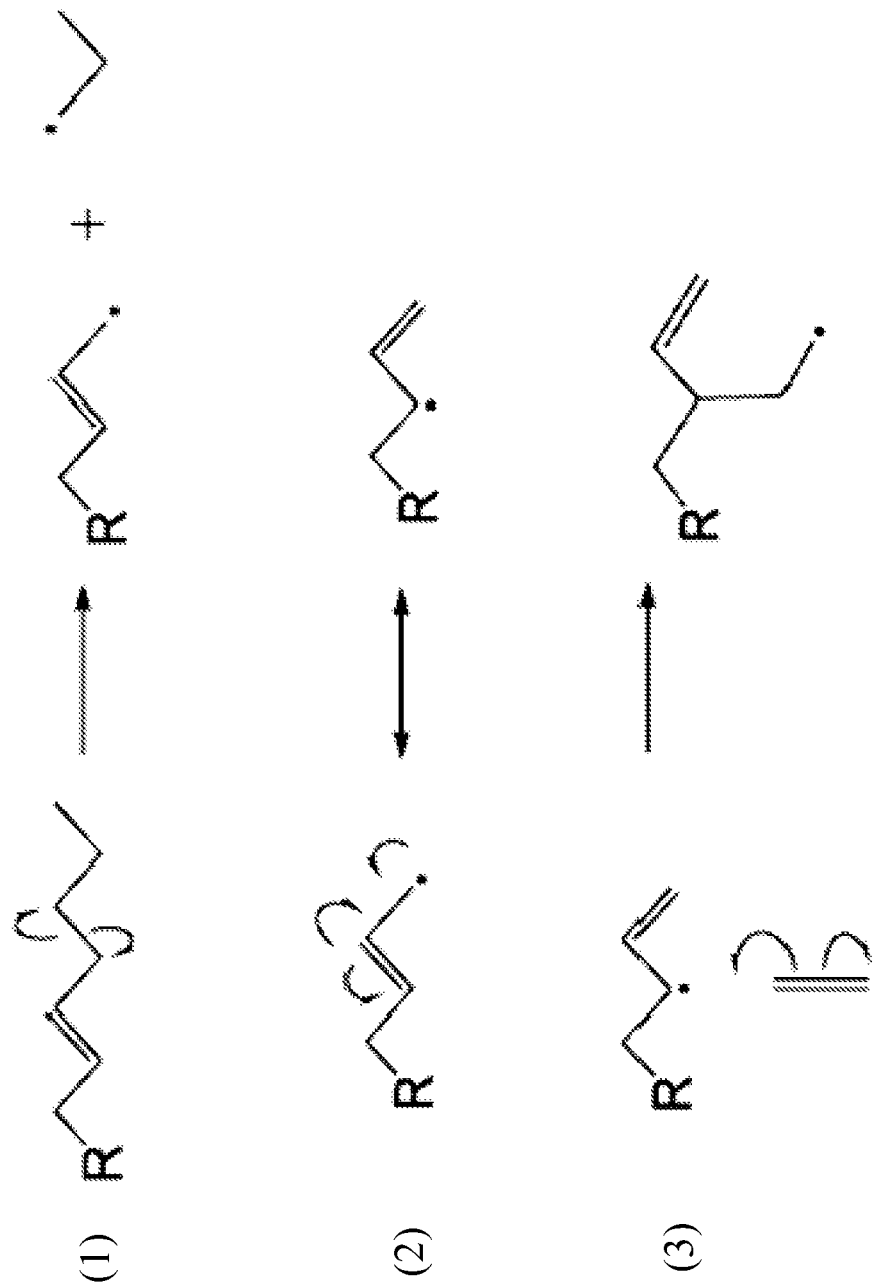
FIG. 1 shows a proposed mechanism for the formation of branched alkene compounds from the reaction of alkyl radical species with ethylene and propylene.

Before the present materials, articles, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps.

It must be noted that, as used in the specification and the appended claims, the singular forms "a," "an" and "the" include plural referents unless the context clearly dictates otherwise. Thus, for example, reference to "an oil" includes a single oil or mixtures of two or more oils.

"Optional" or "optionally" means that the subsequently described event or circumstance can or cannot occur, and that the description includes instances where the event or circumstance occurs and instances where it does not.

Described herein are methods for producing branched alkanes and branched alkenes from a radical precursor. In one aspect, the method involves heating a source having one or more radical precursors in the presence of one or more alkenes. The phrase "a source of the radical precursor" is defined herein as any material that contains carbon-based molecules that can be converted to free radicals upon pyrolysis in the presence of an alkene. In one aspect, the source of the radical precursor can be a heavy oil, a biomass feedstock, or a fatty acid resource.

The term "heavy oil" as defined herein is any source or form of viscous oil. For example, a source of heavy oil includes tar sand. Tar sand, also referred to as oil sand or bituminous sand, is a combination of clay, sand, water, and bitumen.

The term "biomass feedstock" as defined herein refers to material from a biological source, such as, for example, a plant, that can be converted into a source of energy. In some aspects, the energy source is renewable. In one aspect, the biomass feedstock is a lignocellulosic material. "Lignocellulosic material" is any dry material from a plant and includes, at a minimum, carbohydrates such as cellulose and hemicellulose and/or polyphenolic compounds such as lignin. Lignocellulosic material may be obtained from agricultural residues such as, for example, corn stover or wheat straw; from byproducts of wood or paper processing such as, for example, sawdust or paper mill discards; from crops dedicated to biomass production; from municipal waste such as, for example, paper; or a combination thereof.

The term "fatty acid resource" as defined herein is any source of fatty acid. The fatty acid can include the free fatty acid or the corresponding salt thereof. The term "free fatty acid" is referred to herein as the acid form of the fatty acid (i.e., terminal —COOH group) and not the corresponding salt. Alternatively, the fatty acid resource can include precursors to fatty acids. For example, the fatty acid precursor can be a lipid, a triglyceride, a diglyceride or a monoglyceride.

Examples of fatty acid resources include, but are not limited to, vegetable oil, animal fats, lipids derived from biosolids, spent cooking oil, lipids, phospholipids, soapstock, or other sources of triglycerides, diglycerides or monoglycerides. In one aspect, the vegetable oil comprises corn oil, cottonseed oil, canola oil, rapeseed oil, olive oil, palm oil, peanut oil, ground nut oil, safflower oil, sesame oil, soybean oil, sunflower oil, algae oil, almond oil, apricot oil, argan oil, avocado oil, ben oil, cashew oil, castor oil, grape seed oil, hazelnut oil, hemp seed oil, linseed oil, mustard oil neem oil, palm kernel oil, pumpkin seed oil, tall oil, rice bran oil, walnut oil, a combination thereof. In another aspect, the animal fat comprises blubber, cod liver oil, ghee, lard, tallow, derivatives thereof (e.g., yellow grease, used cooking oil, etc.), or a combination thereof.

It is contemplated that the fatty acid resource can be further purified prior to subsequent processing. For example, the fatty acid resource can be distilled or extracted to remove any undesirable impurities. In the alternative, the fatty acid resource can be used as-is. The source of the fatty acid resource will determine if any pre-purification steps are required. The fatty acid resource can subsequently be pyrolyzed in the presence of an alkene using the techniques described below.

In certain aspects, the fatty acid resource can be further processed prior to pyrolysis in order to convert certain components present in the fatty acid resource into other species. In one aspect, the method comprises:

a. separating one or more fatty acids from a fatty acid resource; and
b. heating the fatty acid in the presence of one or more alkenes to produce a fuel or solvent including one or more alkanes, alkenes, or a mixture thereof.

In one aspect, separation step (a) involves removing or isolating one or more fatty acids from the fatty acid resource. A number of different techniques are known in the art for the isolation and purification of fatty acids. For example, U.S. Pat. No. 5,917,501 discloses a process for isolating fatty acids. The process involves hydrolyzing a naturally occurring lipid mixture containing phospholipids, triglycerides, and sterols to form a two-phase product containing a fatty acid phase comprised of fatty acids and sterols, and an aqueous phase comprised of water, glycerol, and glycerol phosphoric acid esters. The aqueous phase is separated from the fatty acid phase and the crude fatty acid phase is heated to convert the free sterols to fatty acid sterol esters. The free fatty acids are distilled from the fatty acid sterol esters to yield purified fatty acids, which are free of cholesterol and other sterols, and phosphorous compounds. In other aspects, the fatty acid resource is exposed to acid in order to hydrolyze a fatty acid precursor present in the fatty acid resource to produce the corresponding free fatty acid. For example, vegetable oils are rich in triglycerides, which upon acid hydrolysis, produce the free fatty acid and glycerol.

In certain aspects, after the separation step, it can be desirable to produce a pure or substantially pure form of the fatty acid. The phrase "substantially pure" as used herein is defined as greater than 90% by weight fatty acid content. The presence of impurities can adversely affect the final composition of the fuel or solvent. For example, if sulfur, oxygen, or nitrogen compounds are present in the fatty acid prior to step (b), undesirable product characteristics result including high sulfur or nitrogen emissions during combustion or side-reactions may occur during step (b) such as the formation of undesirable aromatic compounds.

The nature of the fatty acid will vary depending upon the fatty acid resource. The fatty acid can be a saturated fatty acid, an unsaturated fatty acid, or a combination thereof. Examples of fatty acids include, but are not limited to, butyric acid, lauric acid, myristic acid, palmitic acid, stearic acid, arachidic acid, alpha-linolenic acid, docosahexaenoic acid, eicosapentaenoic acid, linoleic acid, arachidonic acid, oleic acid, erucic acid, a naturally derived fatty acid from a plant or animal source, or a combination thereof. The fatty acid can also be a mixture of free fatty acids.

The source of the radical precursor is heated in the presence of one or more alkenes to produce a branched alkane, a branched alkene, or a combination thereof. In general, the source of the radical precursor is introduced into a pyrolysis reactor, which is a closed vessel that can sustain high internal pressures and temperatures. In one aspect, the microreactors disclosed in U.S. Pat. No. 8,067,653, which are incorporated by reference, can be used herein to conduct the pyrolysis step.

After the source of the radical precursor has been introduced into the pyrolysis reactor, the system is purged with an inert gas such as, for example, nitrogen or argon. Next, an alkene is introduced into the pyrolysis reactor. The term "alkene" is an organic molecule having one carbon-carbon double bond. In one aspect, the alkene is a linear or branched molecule composed solely of carbon and hydrogen. The alkene can be gas or liquid at ambient temperature. In another aspect, the alkene is ethylene, propylene, butene or isomers thereof (e.g., isobutene) or a mixture thereof.

The amount of alkene that is introduced into the pyrolysis reactor can vary. In certain aspects, a molar excess of alkene relative to the source of the radical precursor can be employed. For example, the molar ratio of fatty acid resource to alkene is from 1:1 to 1:5, 1:1 to 1:4, 1:1 to 1:3, or 1:1 to 1:2, where the moles of gas are calculated using van der Waal's equation of state for real gases. In other aspects, there can be a substantially higher amount of the source of the radical precursor resource relative to alkene. Thus, depending upon process conditions and reaction kinetics, the relative amount of alkene and source of the radical precursor can be modified accordingly.

Once the pyrolysis reactor has been charged with the source of the radical precursor resource and alkene, the reactor is heated internally in order to convert the radical precursor to the branched alkane or branched alkene. The temperature of the heating step can vary amongst different parameters. In one aspect, the temperature of the heating step is from 220° C. to 650° C., 300° C. to 650° C., 350° C. to 650° C., 350° C. to 600° C., or 250° C. to 500° C. In another aspect, the heating step is conducted at 450° C.

The duration of the heating step can also vary depending upon the amount of the source of the radical precursor and alkene used and the pressure within the pyrolysis reactor. In one aspect, the pressure in the pyrolysis reactor can range from ambient to 2,000 psi, such as, for example, 130 psi, 200 psi, or 500 psi, and the duration of the heating step can be from seconds up to 12 hours. In one aspect, the heating step is from two seconds up to 8 hours. In another aspect, the heating step is conducted for 2 hours. In a further aspect, the reaction time and temperature are selected to maximize fatty acid feed conversion and liquid product yield while minimizing gas, aromatic compounds, and solids formation.

By varying reaction conditions during the conversion of the source of the radical precursor to the branched alkanes and branched alkenes, one of ordinary skill in the art can produce short or long chain alkanes/alkenes for fuels and solvents. For example, prolonged heating at elevated temperatures can produce short chain alkanes/alkenes that can be useful as fuels. Alternatively, long chain alkanes/alkenes can be produced by one of ordinary skill in the art by reducing the heating time and temperature. If short chain alkanes or alkenes are produced, reaction conditions can be controlled such that these products are gases (e.g., methane, propane, butane, etc.) that can be readily removed from the reactor.

Figure 2:
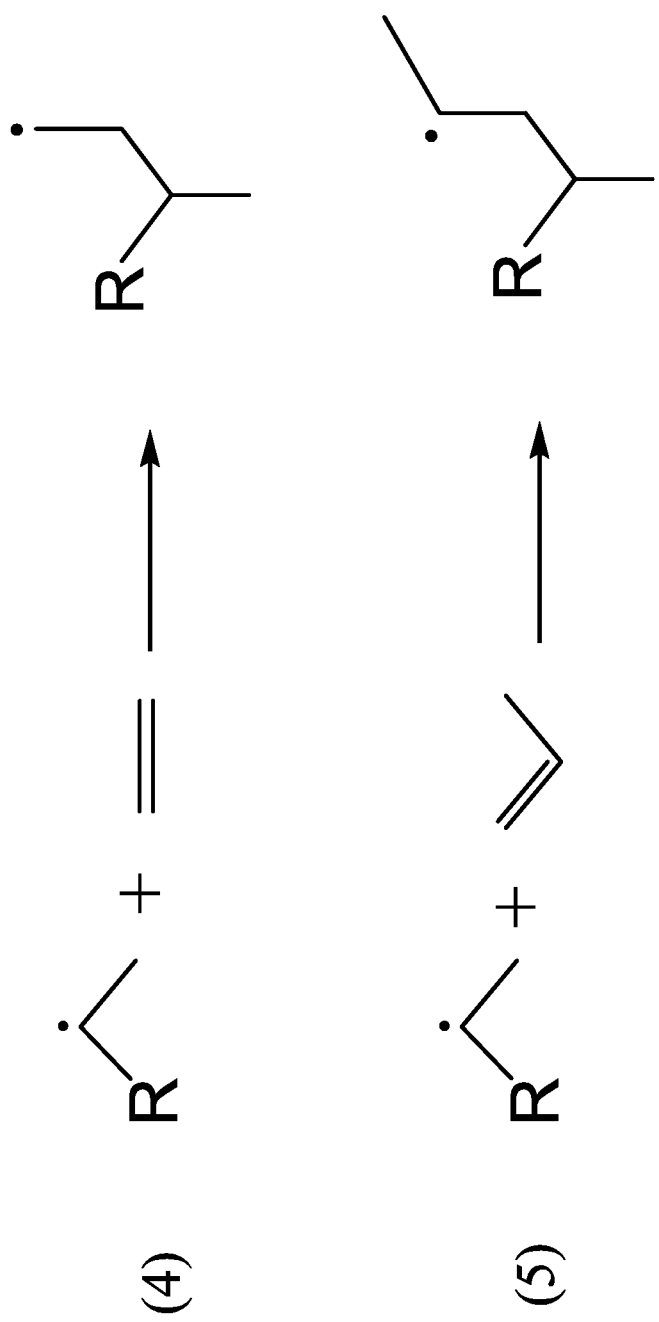
FIG. 2 shows a proposed mechanism for the formation of alkane branched compounds from the reaction of alkyl radical species with ethylene and propylene.

The methods described herein result in the formation of branched alkanes and alkenes. Not wishing to be bound by theory, mechanisms for producing branched alkanes and alkenes are depicted in FIGS. 1 and 2. FIG. 1 shows a possible reaction scheme for the formation of branched alkene compounds from the reaction of alkyl radical species with ethylene (or alternatively propylene). In one aspect, the formation of branched compounds during pyrolysis of a free fatty acid conducted in presence of ethylene is a multi-step process that follows the thermal deoxygenation of the fatty acid. One possible product of fatty acid deoxygenation is the generic organic compound "a" in reaction (1), where R represents an alkyl group. These compounds are known to undergo cracking at 350 to 450° C. between 1 to 4 hours described herein to produce radicals labeled "b" and "c", respectively. In reaction (2) radical "b" undergoes a molecular rearrangement to yield radical "d". Reaction (3) shows ethylene (labeled as "e") reacting with radical "c", which results in the formation of branched radical "f".

FIG. 2 shows a possible reaction scheme for the formation of branched alkane compounds from the reaction of alkyl radical species with ethylene (or alternatively propylene). A possible product of fatty acid deoxygenation and cracking followed by hydrogen migration to the more stable structure (common in liquid phase free radical systems) is the generic organic compound "a" in reaction (4) and (5), where R represents an alkyl group. These radical species, formed from alkane cracking at 350 to 450° C.) between 1 to 4 hours described herein can react with ethylene "b" or propylene "d" to form branched radical alkane species "c" and "e". All terminal products identified In FIGS. 1 and 2 through product analysis can be terminated through subsequent hydrogen abstraction from other molecules in the liquid phase.

In one aspect, the methods disclosed herein produce a mixture of products including $C_6$ to $C_{12}$ I-alkenes, $C_6$ to $C_{18}$ internal alkenes, $C_6$ to $C_{19}$ n-alkanes, aromatics, branched hydrocarbons, cyclic hydrocarbons, $C_4$ to $C_{18}$ fatty acids, and additional unidentified products. In this aspect, use of an alkene headspace gas can increase the proportion of desired products such as, for example, branched hydrocarbons.

In fuel formulations, branched-chain alkanes and alkenes are preferred because they are less prone to the phenomenon of knocking (due to their high octane number) compared with their straight-chain homologues. In addition, branched alkanes and alkenes find widespread industrial applications as solvents for nonpolar chemical species. Straight-chain alkanes and alkenes are conventionally converted to branched isomers in industrial processes such as reforming and isomerization in presence of metal catalysts. Additionally, the methods described herein do not require the addition of supplemental hydrogen (i.e., hydrogen that is added to the reaction prior to and/or during pyrolysis of the fatty acid). Supplemental hydrogen. However, supplemental hydrogen does not include hydrogen that may be produced in situ during the pyrolysis of the fatty acid in the presence of the alkene. These techniques also require pure feedstocks. One significant advantage of the methods described herein is that branched alkanes can be created without using any catalysts, which reduces capital and operating costs as well as allow the use of relatively impure feedstock compared to conventional petroleum-based operations.

As shown below in the Examples, the methods described produce higher concentrations of branched alkanes and alkenes in the liquid product compared to the pyrolysis of the same fatty acid under an inert atmosphere.

In another aspect, the use of a decarboxylation catalyst can be used to facilitate the conversion of the fatty acid to the alkane or alkene. Depending upon the selection of the decarboxylation catalyst, the catalyst can reduce the heating temperature and time. This is desirable in certain instances, particularly if degradation of the alkane/alkene or side reactions (e.g., aromatization) are to be avoided. Examples of decarboxylation catalysts include, but are not limited to, activated alumina catalysts. The use of the decarboxylation catalyst is optional; thus, the methods described herein do not require the presence of a decarboxylation catalyst.

The methods described herein can be performed in batch, semi-batch, or continuous modes of operation. For example, with respect to the pyrolysis of the free fatty acid, a continuous reactor system with unreacted acid recycle could be employed to enhance the yield of desirable alkane/alkene by limiting the duration and exposure of the alkane/alkene in the high temperature reactor. Carbon dioxide and small hydrocarbon products could be recovered, with the gas phase hydrocarbons used as fuel for the reactor or other applications. When a continuous reactor system is used, process conditions can be optimized to minimize reaction temperatures and times in order to maximize product yields and composition. As the reaction can be adjusted to select for a preferred carbon chain length (long, short or medium), the technology has the capability of enriching for a particular product group. From these groups, individual chemicals could be recovered, purified, and sold as pure platform chemicals.

The methods described herein provide numerous advantages over current techniques for producing renewable biofuels. The methods described herein produce higher amounts liquid hydrocarbons, which is demonstrated in the Examples. As described above, the methods described herein can be used to produce higher concentrations of branched alkanes and alkenes that are useful in modem fuel mixtures. The methods utilize renewable resources to create a non-petroleum based sustainable fuel source with low levels of aromatic compounds.

The hydrocarbons formed herein are chemically much more uniform than other high temperature processes currently used. For example, the fuels or solvents produced herein are substantially free of aromatic compounds, where the term "substantially free" is defined as less than 5% by weight aromatic compounds. It is also contemplated that no aromatic compounds are present in the fuels or solvents.

It is anticipated the methods described herein will provide higher product yields than other pyrolysis technologies and will produce a fuel much more similar to diesel than biodiesel. In one aspect, the liquid product yield as a weight percentage of fatty acid feedstock is from 75% to 110%. In another aspect, the liquid product yield as weight percentage of fatty acid feedstock is from 95 to 110%, or is about 98% or about 107%. The products will not have the problems of biodiesel in that they will be oxidatively stable and will have pour points similar to conventional diesel fuel.

In one aspect, the elemental composition of the liquid product can be determined. In one aspect, the liquid product contains a higher proportion by weight of carbon than the feedstock. In this aspect, the carbon content of the feedstock can be from 70 to 80% by weight carbon, from 75 to 79% by weight carbon, or can be about 76.7% by weight carbon. Further in this aspect, the carbon content of the liquid product can be from 80 to 90% by weight carbon, from 83 to 85.5% by weight carbon, or can be about 84% by weight carbon.

In a further aspect, the liquid product contains a lower proportion by weight of oxygen than the feedstock. In this aspect, the oxygen content of the feedstock can be from 5 to 15% by weight oxygen, from 8 to 13% by weight oxygen, or can be about 11.3% by weight oxygen. Further in this aspect, the oxygen content of the liquid product can be less than 5% by weight oxygen, or can be about 2.1%, about 2.8%, about 3.0%, about 3.1%, or about 3.6% by weight oxygen.

In a still further aspect, deoxygenation of the fatty acid occurs during the methods disclosed herein. The methods described herein increase the rate of decarboxylation of fatty acids when compared to performing the same pyrolysis reaction under an inert atmosphere (e.g., nitrogen).

In one aspect, deoxygenation rates can increase as initial headspace pressure increases. Carbon dioxide and/or carbon monoxide is released during the methods disclosed herein. Further in this aspect, carbon dioxide production can increase as initial headspace pressure increases. In yet another aspect, nitrogen and sulfur content of the feedstock and the liquid product(s) is below 10 ppm. In this aspect, the feedstock and liquid product are said to be "substantially free" of nitrogen and sulfur.

Finally, the input costs are expected to be lower using the methods described herein when compared to competitive, exisiting biodiesel technologies. In particular, the process does not require a hydrogenation step to produce hydrocarbons, which adds significant cost to the process. Moreover, as demonstrated in the Examples, the methods described herein decaroboxylate the free fatty acid quicker compared to other techniques, which ultimately shortens reaction times and costs.

EXAMPLES

The following examples are put forth so as to provide those of ordinary skill in the art with a complete disclosure and description of how the materials, articles, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The laboratory methodologies for sample preparation, reactor assembly and reaction protocols, product handling, analytical procedures for chemical characterization and quantitation described in U.S. Pat. No. 8,067,653 B2 issued on Nov. 29, 2011 were used below. Reaction temperature and time were selected based on previous experiments with thermal cracking of oleic acids (see Asomaning et al., J. Anal. Appl. Pyrolysis, 2014, 105:1-7). Conditions selected for this study maximized fatty acid feed conversion and liquid product yield while minimizing the formation of gases, aromatic compounds, and solids. Reactions were conducted by loading the free fatty acid in the microreactor, sealing the microreactor, and purging the microreactor with free fatty acid with nitrogen. The pressure inside the reactor at the beginning of the pyrolysis reaction is controlled by charging the microreactor with gas.

Table 1 shows that from microreactors loaded with oleic acid and nitrogen and reacted for 2 hours at 410° C., it is possible to recover 81.39% of the total initial mass as liquid product. Pyrolysis experiments conducted in presence of short chain saturated hydrocarbons such as ethane, propane do not produce liquid yields that are statistically different from the control experiment described above. In the case of methane, the liquid yield measured was lower than the nitrogen benchmark and measured at approximately 76%. On the other hand, pyrolysis experiments conducted with unsaturated short chain hydrocarbons such as ethylene and propylene produced substantially higher liquid yields (approximately 98% and 107% respectively).

TABLE 1

Liquid product yield from pyrolysis of oleic acid (410° C., 2 h) in presence of nitrogen and hydrocarbon gases

| Headspace Gas (130 psi) | Mole Ratio (feed:gas)[1] | Liquid Product Yield (wt % of oleic acid feed) |
|---|---|---|
| Nitrogen | 1:1.8 | 81.4 ± 2.6$^a$ |
| Ethylene | 1:1.9 | 98.2 ± 0.9 |
| Ethane | 1:1.9 | 83.0 ± 1.4$^a$ |
| Propylene | 1:2.0 | 107.4 ± 2.6 |
| Propane | 1:2.0 | 83.8 ± 1.1$^a$ |
| Methane | 1:1.8 | 76.7 ± 1.1 |

[1]Moles of gas calculated using the Peng-Robinson equation of state.
$^a$Values with the same superscript letters are not significantly different at the 95% confidence level.

Chemical characterization of the pyrolysis liquid product by GC-MS and GC-FID confirmed the liquid yield data described above and showed that higher concentration of alkanes and alkenes can be obtained by reacting oleic acid with unsaturated short chain hydrocarbons compared to inert gases.

Figure 3:
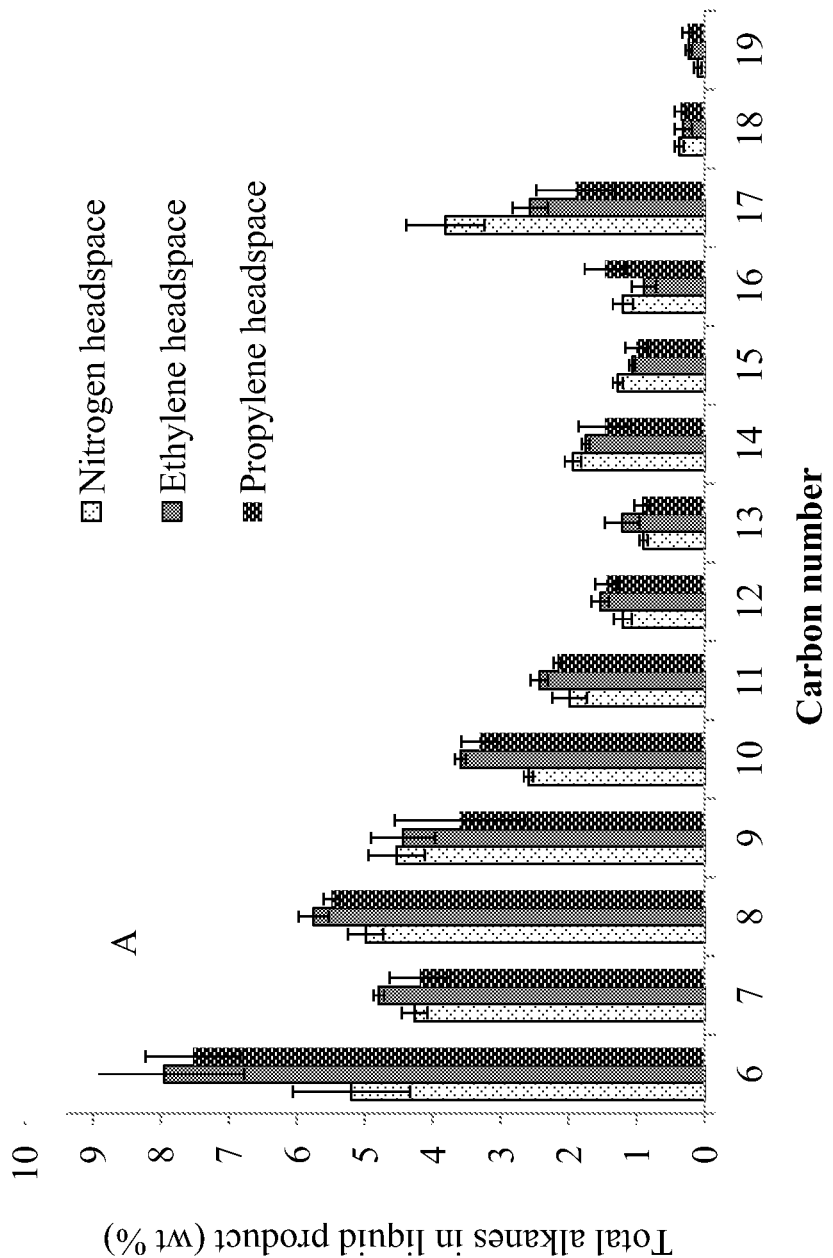
FIG. 3 shows the alkane (linear, branched, and cyclic) composition of liquid oleic acid pyrolysis product from pyrolysis reactions conducted at 410° C. for 2 h using nitrogen, ethylene, and propylene.
Figure 4:
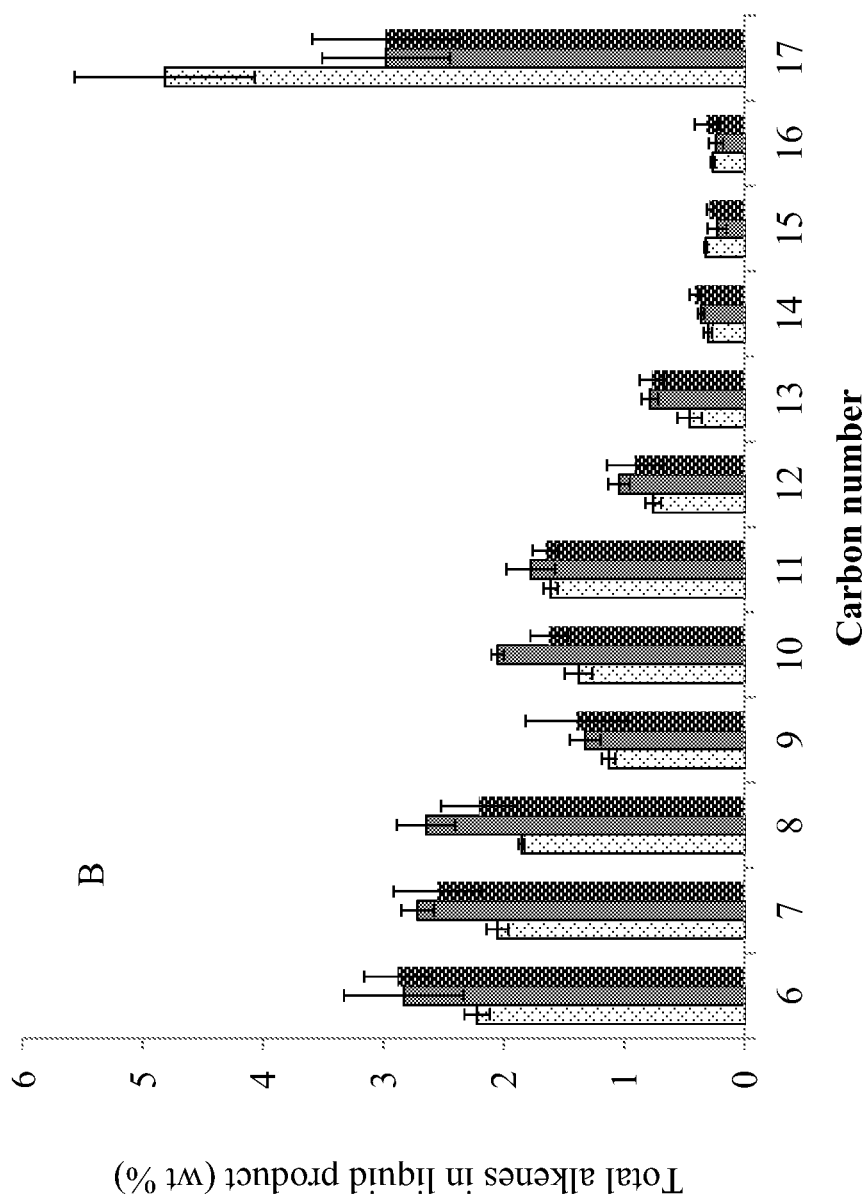
FIG. 4 shows the alkene (linear, branched, and cyclic) composition of liquid oleic acid pyrolysis product from pyrolysis reactions conducted at 410° C. for 2 h using nitrogen, ethylene, and propylene.
Figure 5:
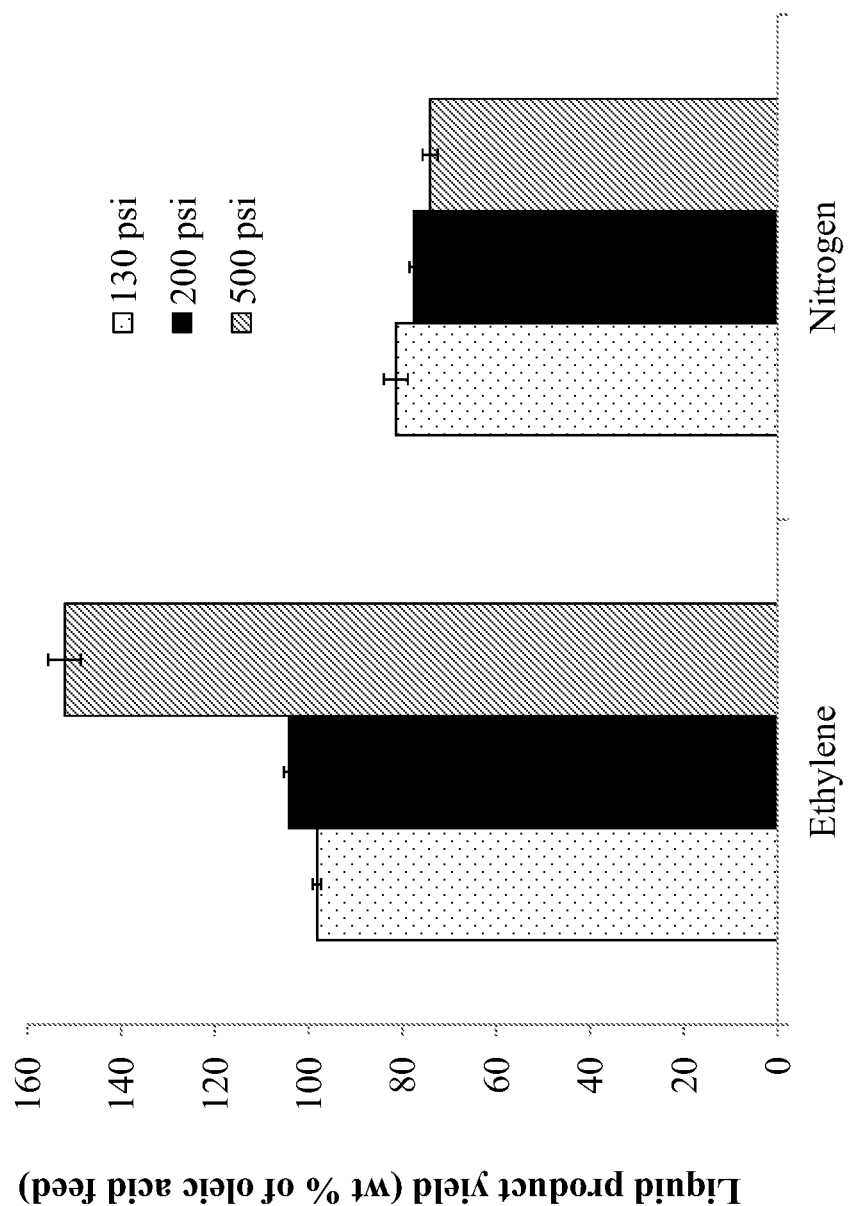
FIG. 5 shows liquid product yields at different initial headspace pressures under nitrogen and ethylene atmospheres.

FIGS. 3 and 4 show that, with the exception of alkanes with carbon number 14, reacting free fatty acids in presence of ethylene yields systematically higher concentrations of both alkanes and alkenes. FIG. 5 shows that these higher concentrations of alkanes and alkenes result with ethylene headspace gas, regardless of the initial headspace gas pressure.

Figure 6:
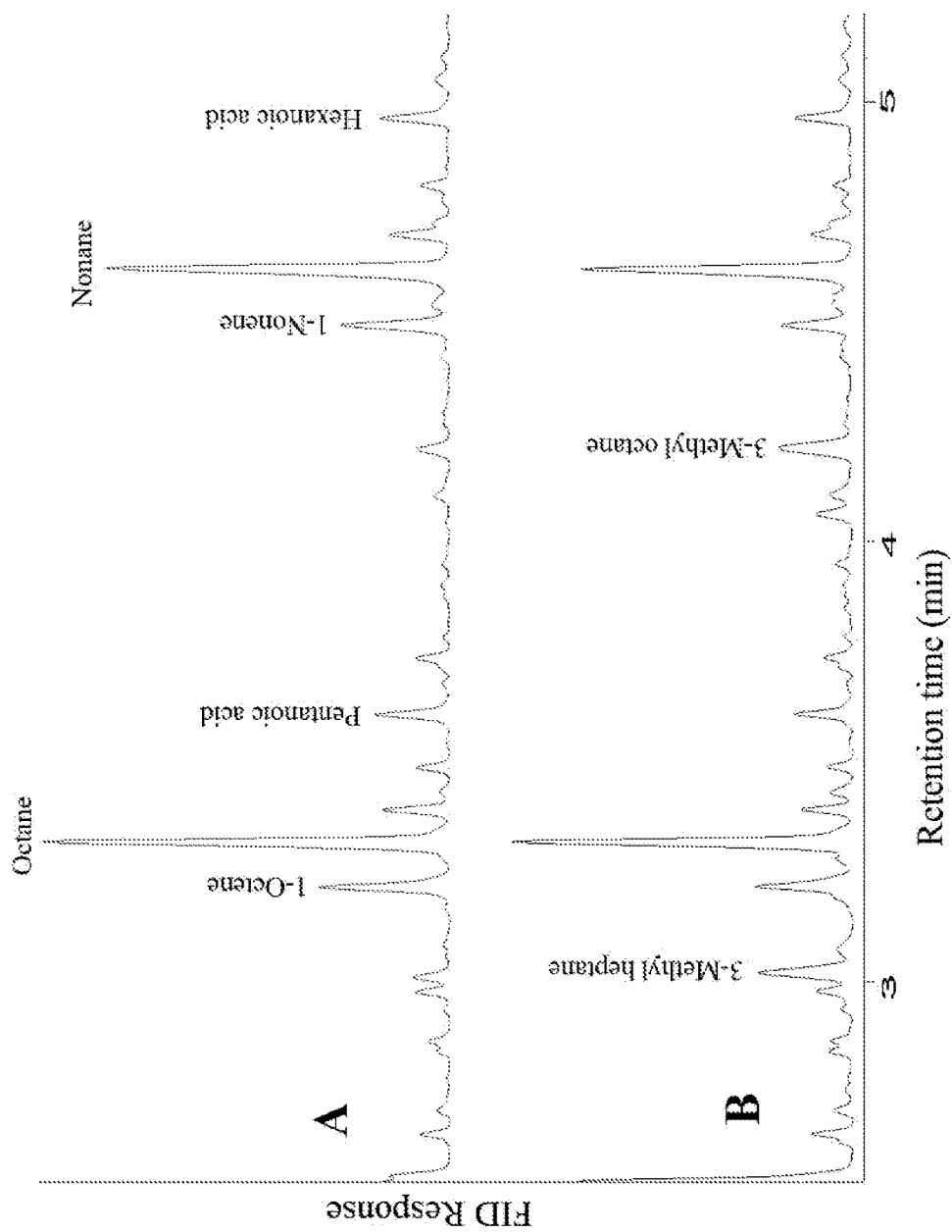
FIG. 6 shows GC-FID chromatograms of liquid oleic acid pyrolysis product obtained from reactions under nitrogen (A) and ethylene (B) headspaces. Reactions were carried out at 410° C. for 2 hours.
Figure 7:
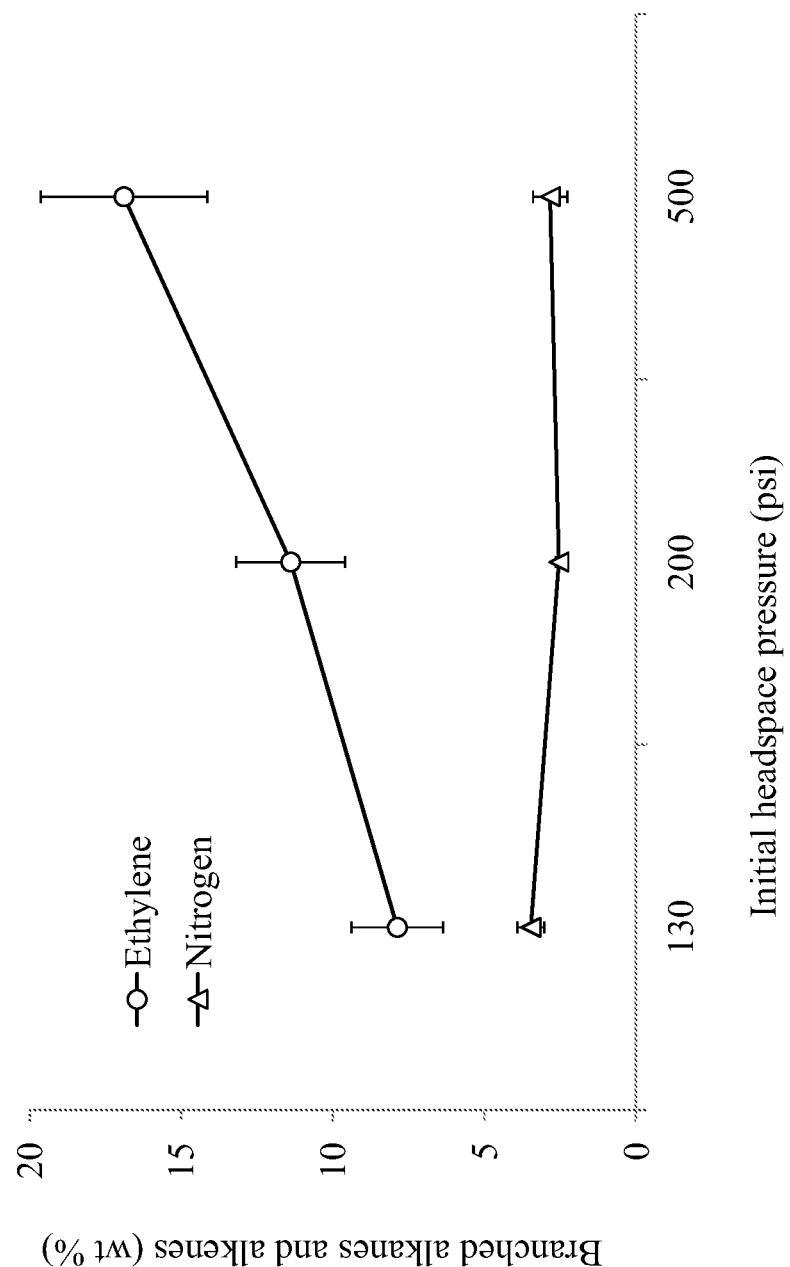
FIG. 7 shows total branched alkanes and alkenes in the liquid product under nitrogen and ethylene atmospheres at different initial headspace pressures.

Liquid product characterization by GC-MS and GC-FID techniques revealed that fatty acids reacted with unsaturated short chain hydrocarbons produced a higher concentration of branched alkanes in the liquid product compared to the same reactions conducted in inert gas atmosphere. FIG. 6 shows a portion of two typical GC-FID chromatograms for liquid samples of oleic acid pyrolysis product obtained from reactions under nitrogen and ethylene headspaces respectively. FIG. 6 clearly shows the presence of a branched alkane with eight carbon atoms in the case of pyrolysis of oleic acid in presence of ethylene. The same compound is practically absent in the case of pyrolysis in presence of nitrogen. FIG. 7 demonstrates that using ethylene as headspace gas leads to an increased yield of branched alkanes and alkenes and that this yield increases with initial headspace pressure, while for nitrogen, the yield of branched compounds stays roughly the same regardless of initial headspace pressure.

Figure 8:
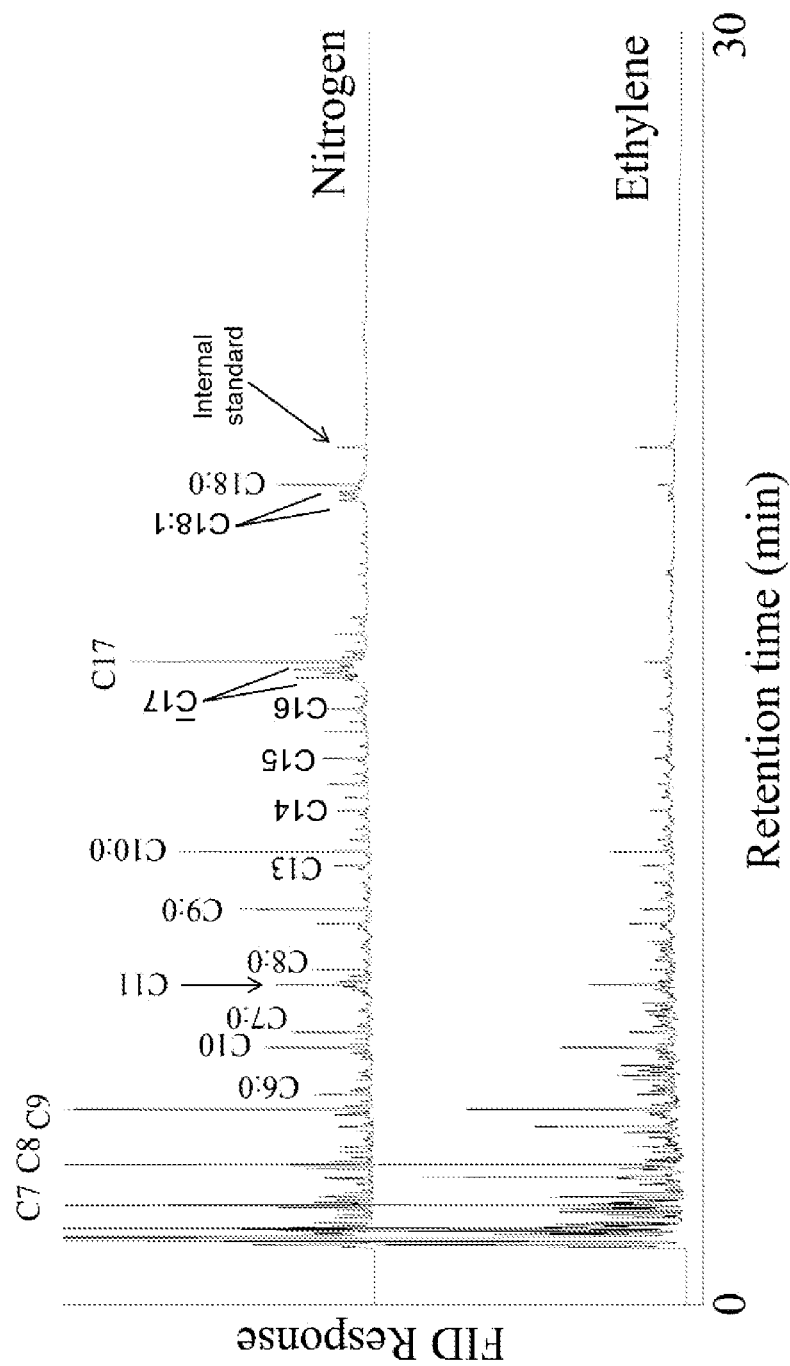
FIG. 8 shows a GC-FID chromatogram of oleic acid pyrolysis products obtained from reactions conducted at 430° C. for 2 hours under initial pressure of 500 psi using nitrogen and ethylene.

A careful analysis of the typical GC-FID chromatograms for the liquid oleic acid pyrolysis product revealed that reactions conducted in the presence of ethylene result in faster fatty acid deoxygenation compared to the same reactions conducted in a nitrogen atmosphere. FIG. 8 shows the typical GC-FID chromatograms of liquid products from the pyrolysis of oleic acid in presence of nitrogen and ethylene, respectively. It is immediately evident by comparing the peaks of the internal standard with the peaks adjacent to the stearic acid peak (C18:0) that in the case of pyrolysis of oleic acid in presence of ethylene, the feedstock is converted more rapidly compared to pyrolysis under an inert atmosphere.

A water/aqueous fraction was not observed in the liquid product obtained under all conditions. This does not imply that water was not produced. Water may not have been observed due to the small feed mass used in this study (1 g). A previous study on a larger sample size demonstrated the production of a water/aqueous fraction during the pyrolysis of free fatty acids. Composition of the liquid product produced under various headspace gases is provided in Table 2.

TABLE 2

Liquid product composition at an initial pressure of 130 psi under inert gas and light hydrocarbon gas atmospheres

| Class of compounds | Weight % of liquid product Headspace gas | | | | | |
|---|---|---|---|---|---|---|
| | Nitrogen | Methane | Ethane | Propane | Ethylene | Propylene |
| $C_6$ to $C_{12}$ 1-alkenes | 3.5 ± 0.2 | 4.1 ± 0.4 | 3.4 ± 0.2 | 3.3 ± 0.4 | 3.8 ± 0.4 | 4.9 ± 1.5 |
| $C_6$ to $C_{18}$ internal alkenes | 11.3 ± 0.7 | 11.7 ± 0.9 | 12.5 ± 0.5 | 12.6 ± 1.3 | 11.2 ± 0.2 | 10.6 ± 1.4 |
| $C_6$ to $C_{19}$ n-alkanes | 23.6 ± 1.9$^a$ | 23.3 ± 2.5$^a$ | 22.4 ± 2.6$^a$ | 23.5 ± 1.1$^a$ | 23.9 ± 0.9$^a$ | 19.5 ± 0.9$^a$ |
| Aromatics | 4.7 ± 0.3$^a$ | 4.4 ± 0.4$^a$ | 4.6 ± 0.5$^a$ | 4.7 ± 0.1$^a$ | 5.5 ± 0.2$^a$ | 6.1 ± 0.3$^b$ |
| Branched hydrocarbons | 3.5 ± 0.4$^a$ | 3.4 ± 0.4$^a$ | 3.0 ± 0.7$^a$ | 2.8 ± 0.6$^a$ | 7.8 ± 1.5$^b$ | 6.9 ± 0.9$^b$ |
| Cyclic hydrocarbons | 9.8 ± 0.7$^a$ | 9.2 ± 0.4$^a$ | 10.2 ± 0.5$^a$ | 10.9 ± 0.7$^a$ | 10.8 ± 0.3$^a$ | 11.2 ± 0.4$^a$ |
| $C_4$ to $C_{18}$ fatty acids | 15.5 ± 0.8$^a$ | 12.6 ± 2.4$^a$ | 11.7 ± 1.7$^a$ | 13.8 ± 1.3$^a$ | 10.9 ± 1.9$^b$ | 9.0 ± 0.2$^b$ |

TABLE 2-continued

Liquid product composition at an initial pressure of 130
psi under inert gas and light hydrocarbon gas atmospheres

| Class of compounds | Weight % of liquid product Headspace gas | | | | | |
|---|---|---|---|---|---|---|
| | Nitrogen | Methane | Ethane | Propane | Ethylene | Propylene |
| Unreacted feed + isomers | 2.1 ± 0.6 | 2.5 ± 0.8 | 2.8 ± 1.9 | 2.5 ± 0.8 | 1.0 ± 0.3 | 1.0 ± 0.5 |
| Unidentified | 18.5 ± 2.8 | 17.2 ± 1.8 | 15.9 ± 0.2 | 16.0 ± 1.9 | 18.1 ± 2.9 | 19.9 ± 1.8 |
| Unaccounted | 8.8 ± 3.4 | 11.5 ± 4.3 | 13.6 ± 1.1 | 9.9 ± 1.9 | 6.9 ± 2.0 | 10.6 ± 3.1 |

$^{a,b}$Values in the same row are not significantly different from a nitrogen atmosphere at the 95% confidence level if they have the same letters.

These experiments show that the efficiency and economic value proposition of the conversion of lipids to hydrocarbons using a two-step approach (hydrolysis of lipids followed by pyrolysis of fatty acids) can be improved by conducting the second step in presence of a short chain unsaturated hydrocarbon such as ethylene. When such species are present, the fatty acid feedstock is converted more rapidly, yielding a greater proportion of liquid product in the valuable gasoline, diesel and jet fuel range. Additionally, the methods described herein result in the formation of branched alkanes and alkenes, which are essential elements in modern fuel mixtures.

The elemental composition of liquid product was determined using a Carlo Erba EA1108 elemental analyzer at the Analytical and Instrumentation Laboratory in the Chemistry Department at the University of Alberta. Results are presented in Table 3.

TABLE 3

Elemental composition of liquid product together with oleic acid feed

| Headspace gas (pressure in psi) | Element (wt %) | | | | |
|---|---|---|---|---|---|
| | Carbon | Hydrogen | Nitrogen | Sulfur | Oxygen* |
| Feed | 76.7 ± 0.1 | 12.1 ± 0.0 | BDL | BDL | 11.3 ± 0.1 |
| Nitrogen (130) | 83.8 ± 0.2 | 12.6 ± 0.0 | BDL | BDL | 3.6 ± 0.1 |
| Ethylene (130) | 83.8 ± 0.2 | 12.6 ± 0.0 | BDL | BDL | 3.6 ± 0.3 |
| Nitrogen (200) | 84.4 ± 0.2 | 12.2 ± 0.1 | BDL | BDL | 3.0 ± 0.3 |
| Ethylene (200) | 84.3 ± 0.2 | 12.6 ± 0.0 | BDL | BDL | 3.1 ± 0.1 |
| Nitrogen (500) | 84.5 ± 0.3 | 12.7 ± 0.1 | BDL | BDL | 2.8 ± 0.3 |
| Ethylene (500) | 85.1 ± 0.2 | 12.8 ± 0.0 | BDL | BDL | 2.1 ± 0.1 |

*Calculated by difference.
BDL: below detection limit (10 ppm).

The results presented in Table 3 show that both nitrogen and sulfur were below the detection limit of 10 ppm in the feed and, as a consequence, the liquid product also had nitrogen and sulfur content below the detection limit. Further, the results demonstrate deoxygenation during the pyrolysis reaction, irrespective of the headspace gas used. Additionally, the results show an increase in deoxygenation as initial headspace pressure increases.

Figure 9:
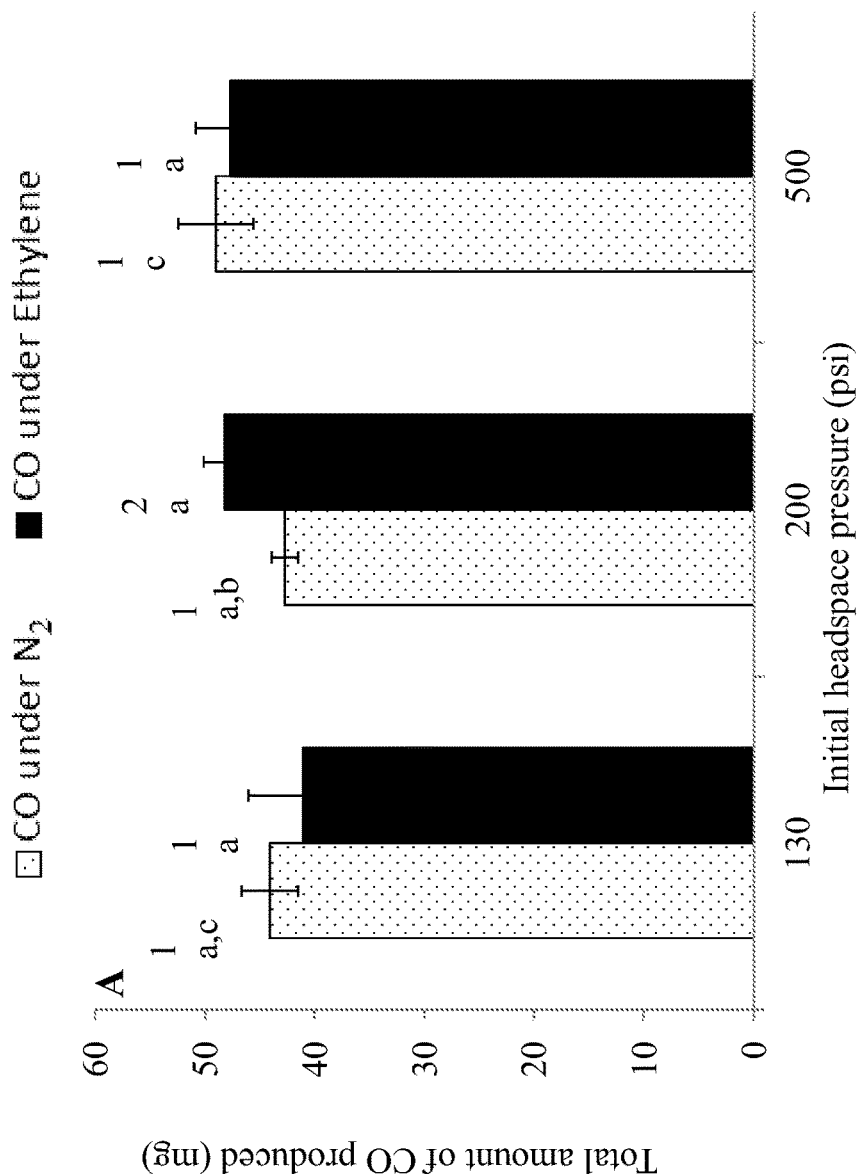
FIG. 9 shows carbon monoxide content in the gas product of nitrogen and ethylene headspace at different initial pressures. Bars with the same numbers above them are not significantly different at the 95% confidence level between the headspace gases at the same pressure. Bars with the same letters are not significantly different at the 95% confidence level for the same headspace gas at different initial headspace pressures.
Figure 10:
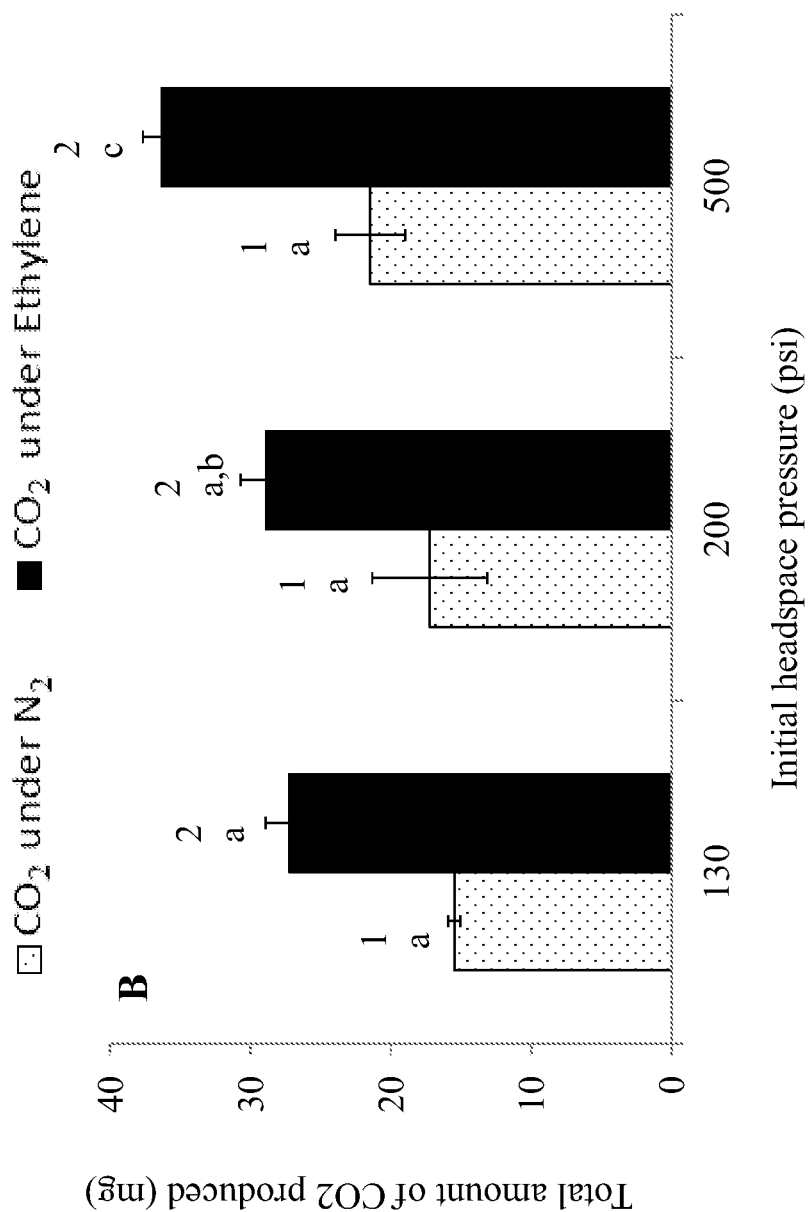
FIG. 10 shows carbon dioxide content in the gas product of nitrogen and ethylene headspace at different initial pressures. Bars with the same numbers above them are not significantly different at the 95% confidence level between the headspace gases at the same pressure. Bars with the same letters are not significantly different at the 95% confidence level for the same headspace gas at different initial headspace pressures.

As seen in FIGS. 9 and 10, carbon monoxide and carbon dioxide are produced using both nitrogen and ethylene as headspace gases.

Throughout this application, various publications are referenced. The disclosures of these publications in their entireties are hereby incorporated by reference into this application in order to more fully describe the compounds, compositions and methods described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed:

1. A method for producing a fuel or solvent comprising a branched alkane, a branched alkene, or a combination thereof, comprising separately introducing (i) a fatty acid comprising a free fatty acid or a salt of a free fatty acid and (ii) one or more alkenes into a reactor and subsequently heating the fatty acid in the presence of the one or more alkenes at a temperature from 350° C. to 600° C. and a pressure from 130 to 2,000 psi in the reactor in the absence of any catalyst to produce the fuel or solvent.

2. A method for producing a fuel or solvent comprising a branched alkane, a branched alkene, or a combination thereof from a fatty acid comprising a free fatty acid or the salt of a free fatty acid, comprising separating the fatty acid from a fatty acid resource, introducing the fatty acid and one or more alkenes into a reactor, and subsequently heating the fatty acid in the presence of the one or more alkenes at a temperature from 350° C. to 600° C. and a pressure from 130 to 2,000 psi in the reactor in the absence of any catalyst to produce the fuel or solvent.

3. The method of claim 2, wherein separating the fatty acid from the fatty acid resource comprises (a) separating one or more triglycerides from the fatty acid resource, (b) hydrolyzing the one or more triglycerides to produce the fatty acid, and (c) isolating the fatty acid.

4. The method of claim 2, wherein the fatty acid resource comprises a monoglyceride, a diglyceride, a triglyceride, a lipid, a free fatty acid or salt thereof, or any combination thereof.

5. The method of claim 2, wherein the fatty acid resource comprises vegetable oil, animal fats, spent cooking oil, lipids, phospholipids, triglycerides, or a bio-oil.

6. The method of claim 5, wherein the fatty acid resource comprises vegetable oil, wherein the vegetable oil comprises corn oil, cottonseed oil, canola oil, rapeseed oil, olive oil, palm oil, peanut oil, ground nut oil, safflower oil, sesame oil, soybean oil, sunflower oil, algae oil, almond oil, apricot oil, argan oil, avocado oil, ben oil, cashew oil, castor oil, grape seed oil, hazelnut oil, hemp seed oil, linseed oil, mustard oil, neem oil, palm kernel oil, pumpkin seed oil, rice bran oil, walnut oil, tall oil, or a combination thereof.

7. The method of claim 5, wherein the fatty acid resource comprises animal fats, wherein the animal fats comprise blubber, cod liver oil, ghee, lard, tallow, or a combination thereof.

8. The method of claim 1 or 2, wherein the fatty acid comprises a saturated fatty acid, an unsaturated fatty acid, or a combination thereof.

9. The method of claim 1 or 2, wherein the fatty acid comprises butyric acid, lauric acid, myristic acid, palmitic acid, stearic acid, arachidic acid, alpha-linolenic acid, docosahexaenoic acid, eicosapentaenoic acid, linoleic acid, arachidonic acid, oleic acid, erucic acid, a naturally derived fatty acid from a plant or animal source, or a combination thereof.

10. The method of claim 1 or 2, wherein the one or more alkenes is ethylene, propylene, butene or an isomer thereof, or any combination thereof.

11. The method of claim 1 or 2, wherein the heating step is conducted at a temperature from 350° C. to 500° C. for two seconds up to 8 hours.

12. The method of claim 1 or 2, wherein the heating step is conducted in the absence of supplemental hydrogen.

13. The method of claim 1 or 2, wherein the fatty acid undergoes decarboxylation during said heating and wherein the rate of decarboxylation of the fatty acid is greater when heated in the presence of the one or more alkenes when compared to the same fatty acid that is heated under an inert atmosphere at the same reaction temperature and reaction time.

14. The method of claim 13, wherein the inert atmosphere is nitrogen.

* * * * *